(12) United States Patent
Thomas et al.

(10) Patent No.: US 11,778,168 B2
(45) Date of Patent: Oct. 3, 2023

(54) REFERENCE FRAME DETECTION USING SENSOR METADATA

(71) Applicant: ATI TECHNOLOGIES ULC, Markham (CA)

(72) Inventors: Sonu Thomas, Markham (CA); Baochun Li, Markham (CA); Yang Liu, Toronto (CA); Ihab Amer, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 17/031,343

(22) Filed: Sep. 24, 2020

(65) Prior Publication Data

US 2022/0094908 A1    Mar. 24, 2022

(51) Int. Cl.
*H04N 19/105* (2014.01)
*H04N 19/136* (2014.01)
*H04N 19/172* (2014.01)
*H04N 19/85* (2014.01)
*H04N 19/46* (2014.01)

(52) U.S. Cl.
CPC ......... *H04N 19/105* (2014.11); *H04N 19/136* (2014.11); *H04N 19/172* (2014.11); *H04N 19/46* (2014.11); *H04N 19/85* (2014.11)

(58) Field of Classification Search
CPC .... H04N 19/105; H04N 19/85; H04N 19/136; H04N 19/172
See application file for complete search history.

(56) References Cited

U.S. PATENT DOCUMENTS

| | | | | |
|---|---|---|---|---|
| 8,588,272 B1* | 11/2013 | Pejhan | ................. | H04N 19/105 250/201.9 |
| 2011/0109753 A1* | 5/2011 | Srinivasamurthy | .... | H04N 19/14 375/E7.076 |
| 2011/0249742 A1* | 10/2011 | Price | ...................... | H04N 19/85 375/E7.123 |
| 2013/0195183 A1* | 8/2013 | Zhai | ..................... | H04N 19/117 375/240.12 |
| 2013/0223525 A1* | 8/2013 | Zhou | ..................... | H04N 19/105 375/E7.243 |
| 2014/0003501 A1* | 1/2014 | Soroushian | ............. | G06F 16/73 375/E7.243 |
| 2016/0070900 A1* | 3/2016 | Kim | ....................... | G06F 21/35 726/3 |
| 2019/0045213 A1* | 2/2019 | Raut | .................... | H04N 19/597 |
| 2021/0098837 A1* | 4/2021 | Ashwood | ............... | G02C 11/10 |

* cited by examiner

*Primary Examiner* — Francis Geroleo

(57) ABSTRACT

Reference frame detection using sensor metadata, including: storing a plurality of first frames each corresponding to first metadata, wherein the first metadata for each first frame of the plurality of first frames is based on first sensor data from one or more sensors; generating a second frame corresponding to second metadata based on the one or more sensors; identifying, based on the first metadata of the plurality of first frames and the second metadata, a reference frame of the plurality of first frames; and encoding the second frame based on the reference frame.

21 Claims, 5 Drawing Sheets

REFERENCE FRAME DETECTION USING SENSOR METADATA

BACKGROUND

Video frames are compressed by identifying a reference frame similar to the frame to be compressed and encoding the frame to be compressed based on the reference frame. Identifying suitable reference frames for compression is often computationally intensive, limiting the degree to which video frames can be compressed.

DETAILED DESCRIPTION

Figure 1:
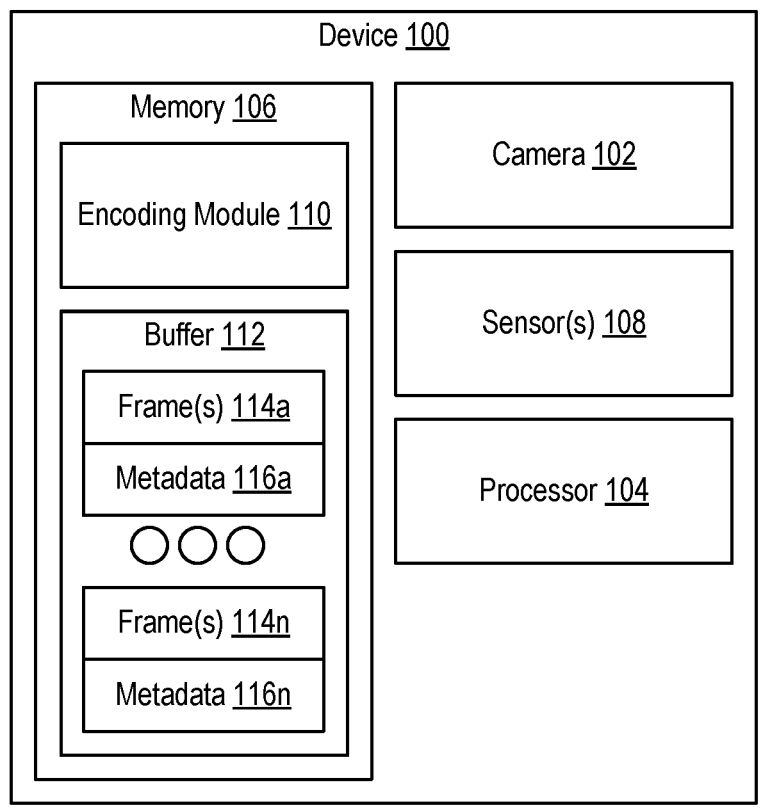
FIG. 1 is a block diagram of an example processor for reference frame detection using sensor metadata according to some embodiments.

In some embodiments, a method of reference frame detection using sensor metadata, includes: storing a plurality of first frames each corresponding to first metadata, wherein the first metadata for each first frame of the plurality of first frames is based on first sensor data from one or more sensors; generating a second frame corresponding to second metadata based on the one or more sensors; identifying, based on the first metadata of the plurality of first frames and the second metadata, a reference frame of the plurality of first frames; and encoding the second frame based on the reference frame.

In some embodiments, the one or more sensors include an accelerometer, a magnetometer, a gyroscope or an Inertial Measurement Unit (IMU). In some embodiments, generating the second frame includes: generating second sensor data based on the one or more sensors; and generating the second metadata by applying a sensor fusion algorithm to the second sensor data. In some embodiments, the second sensor data includes magnetic field data, linear acceleration data, or angular rate data. In some embodiments, the second metadata includes an angle of orientation, a heading, a linear acceleration, or a measured gravity. In some embodiments, storing the plurality of first frames includes storing the plurality of first frames in a buffer; and identifying the reference frame includes identifying the reference frame from the buffer. In some embodiments, the method further includes storing the encoded second frame.

In some embodiments, an apparatus for reference frame detection using sensor metadata performs steps including: storing a plurality of first frames each corresponding to first metadata, wherein the first metadata for each first frame of the plurality of first frames is based on first sensor data from one or more sensors; generating a second frame corresponding to second metadata based on the one or more sensors; identifying, based on the first metadata of the plurality of first frames and the second metadata, a reference frame of the plurality of first frames; and encoding the second frame based on the reference frame.

In some embodiments, the one or more sensors include an accelerometer, a magnetometer, a gyroscope or an Inertial Measurement Unit (IMU). In some embodiments, generating the second frame includes: generating second sensor data based on the one or more sensors; and generating the second metadata by applying a sensor fusion algorithm to the second sensor data. In some embodiments, the second sensor data includes magnetic field data, linear acceleration data, or angular rate data. In some embodiments, the second metadata includes an angle of orientation, a heading, a linear acceleration, or a measured gravity. In some embodiments, storing the plurality of first frames includes storing the plurality of first frames in a buffer; and identifying the reference frame includes identifying the reference frame from the buffer. In some embodiments, the steps further include storing the encoded second frame.

In some embodiments, a computer program product disposed upon a non-transitory computer readable medium includes computer program instructions for reference frame detection using sensor metadata that, when executed, cause a computer system to perform steps including: storing a plurality of first frames each corresponding to first metadata, wherein the first metadata for each first frame of the plurality of first frames is based on first sensor data from one or more sensors; generating a second frame corresponding to second metadata based on the one or more sensors; identifying, based on the first metadata of the plurality of first frames and the second metadata, a reference frame of the plurality of first frames; and encoding the second frame based on the reference frame.

In some embodiments, the one or more sensors include an accelerometer, a magnetometer, a gyroscope or an Inertial Measurement Unit (IMU). In some embodiments, generating the second frame includes: generating second sensor data based on the one or more sensors; and generating the second metadata by applying a sensor fusion algorithm to the second sensor data. In some embodiments, the second sensor data includes magnetic field data, linear acceleration data, or angular rate data. In some embodiments, the second metadata includes an angle of orientation, a heading, a linear acceleration, or a measured gravity. In some embodiments, storing the plurality of first frames includes storing the plurality of first frames in a buffer; and identifying the reference frame includes identifying the reference frame from the buffer. In some embodiments, the steps further include storing the encoded second frame.

FIG. 1 is a block diagram of a non-limiting example device 100. The example device 100 can be implemented as a variety of computing devices, including smart phones, mobile devices, personal computers, peripheral hardware components, video-capable cameras, and the like. The device 100 includes a camera 102. The camera 102 captures light that is encoded by the processor 104 into a digital image or "frame." A plurality of sequential frames forms a video sequence. In some embodiments, audio for the video sequence is captured via a microphone or other audio sensor (not shown). Each frame of the plurality of frames is stored in memory 106.

The memory 106 includes volatile storage, non-volatile storage, or combinations thereof for data including encoded frames. In some embodiments, the memory 106 includes volatile storage such as Random Access Memory. In some embodiments, the memory 106 includes non-volatile storage such as flash storage, solid state disks, disk storage, and the like.

The device 100 also includes one or more sensors 108. The one or more sensors 108 are hardware sensors 108 that measure orientation or movement of the device 100. For example, in some embodiments, the one or more sensors include an accelerometer, a magnetometer, or a gyroscope. In other embodiments, the one or more sensors 108 includes an Inertial Measurement Unit (IMU) that combines the functionality of an accelerometer, a magnetometer, and a gyroscope. For example, in some embodiments, the one or more sensors 108 includes a 9-axis Inertial Measurement Unit capable of 3-axis magnetic field readings, 3-axis linear acceleration readings, and 3-axis angular rate readings.

In some embodiments, encoding of frames is performed by an encoding module 110. The encoding module 110 is implemented as one or more software components stored in memory 106. In some embodiments, the encoding module 110 is at least partially implemented in other hardware components of the device 100. The encoding module 110 generates a frame (e.g., an image) using data from the camera 102. The frame is encoded as a two-dimensional array of pixels. The encoding module 110 also generates metadata for the generated frame based on the one or more sensors 108. The metadata includes orientation data, motion data, or combinations thereof indicating the orientation and motion of the device 100 when the corresponding frame was captured.

The metadata is based on sensor data from the one or more sensors 108. For example, to generate the metadata for a given frame, the one or more sensors 108 generate sensor data including magnetic field data, linear acceleration data or angular rate data. A sensor fusion algorithm is applied to the sensor data to generate the metadata. A sensor fusion algorithm is an algorithm that accepts, as input, sensor readings from a plurality of sensors and calculates, from the sensor data, various metrics. In some embodiments, such metrics include an angle of orientation of the device 100 (e.g., pitch, a roll, a yaw), a heading (e.g., a faced direction) of the device 100, a linear acceleration of the device 100, or a measured gravity experienced by the device. For example, the sensor fusion algorithm accepts, as input, magnetic field data, linear acceleration data or angular rate data and provides, as output, an angle of orientation of the device 100 (e.g., pitch, a roll, a yaw), a heading (e.g., a faced direction) of the device 100, a linear acceleration of the device 100, or a measured gravity experienced by the device.

Instead of storing a frame by storing the color values for each pixel in a frame, image compression allows for some frames to instead be stored as one or more transformations applied to another frame (e.g., a "reference frame"). In other words, where a frame to be compressed is similar to a reference frame, the compressed frame is encoded as the one or more transformations that, if applied to the reference frame, would result in the uncompressed frame. Existing solutions for identifying a reference frame to compress another frame require iterating through all available reference frames for a potential match and using a best available match as the reference frame for compressing the other frame. This is computationally intensive and results in significant power and computational resource usage.

The encoding module 110 identifies, for a generated frame, a reference frame using the metadata of the generated frame and metadata for stored frames that are potential reference frames. For example, assume that a plurality of first frames are stored in memory 106 with each of the first frames having corresponding first metadata (e.g., based on the one or more sensors 108). In some embodiments, the plurality of first frames are stored in a buffer 112. The buffer 112 is an allocated portion of memory 106 for storing frames prior or concurrent to storing the frames in longer-term storage (e.g., non-volatile memory 106). For example, the buffer 112 stores the N-most recently encoded frames. The encoding module 110 stores a new frame in the buffer 112 by overwriting the oldest stored frame, assuming a fully occupied buffer 112. As an example, the plurality of first frames are stored as frames 114a-n in the buffer 112, with each entry in the buffer 112 also including metadata 116a-n (e.g., the first metadata).

After generating a second frame and second metadata, the encoding module 110 identifies, based on the first metadata of the plurality of first frames and the second metadata for the second frame, a reference frame from the plurality of first frames (e.g., from the buffer 112). In some embodiments, identifying the reference frame includes identifying a first frame of the plurality of first frames having first metadata most similar to the second metadata. For example, the first metadata for each first frame in the plurality of first frames is compared to the second metadata to identify the first frame whose metadata has a highest degree of similarity relative to the second frame. As another example, a subset of the first frames is identified (e.g., N first frames with first metadata having a highest degree of similarity to the second metadata, those first frames with first metadata having a degree of similarity to the second metadata above a threshold). The reference frame is then identified from the subset of the first frames based on image similarity to the second frame. In other words, the reference frame is identified as the first frame in the subset whose image data is most similar to the second frame. For example, assume a device 100 pans across an area to generate a first frame, and then pans back across the same area to generate a second frame. In this example, the first frame and the second frame capture a similar field of view for the camera 102. The first metadata for the first frame indicates a similar heading and angle of orientation as the second metadata for the second frame. Accordingly, the first metadata is selected as a reference frame for encoding the second frame.

In other embodiments, the reference frame is identified as having absolute values of first metadata most similar to second metadata but in an opposing direction. For example, assume that a first frame was captured as the device 100 pans across a particular area, and that a second frame was captured as the device 100 pans back across the particular area. In this example, metadata attributes such as linear acceleration would be similar in magnitude, assuming the device 100 pans at a similar speed, but in an opposite direction. One skilled in the art would appreciate that, when evaluating the similarity between first and second metadata for selection of metadata, comparing some attributes is performed to identify similar values of the attributes (e.g., magnetic field readings, headings), while comparing other attributes is performed to find values of similar magnitude but opposite direction (e.g. linear acceleration, gravity).

After identifying the reference frame, the encoding module 110 encodes the second frame based on the identified reference frame. Encoding the second frame includes encoding the second frame as one or more transformations, deltas, etc. that, when applied to the reference frame, results in the second frame. In some embodiments, the second frame is then stored in memory 106. For example, the encoded second frame is stored in the buffer 112 or stored other areas of memory 106 (e.g., non-volatile storage). In some embodiments, where the encoded second frame is stored in the buffer 112, the second frame serves as a potential reference frame for encoding other frames (e.g., a third frame) until the second frame is removed from or overwritten in the buffer 112.

Figure 2:
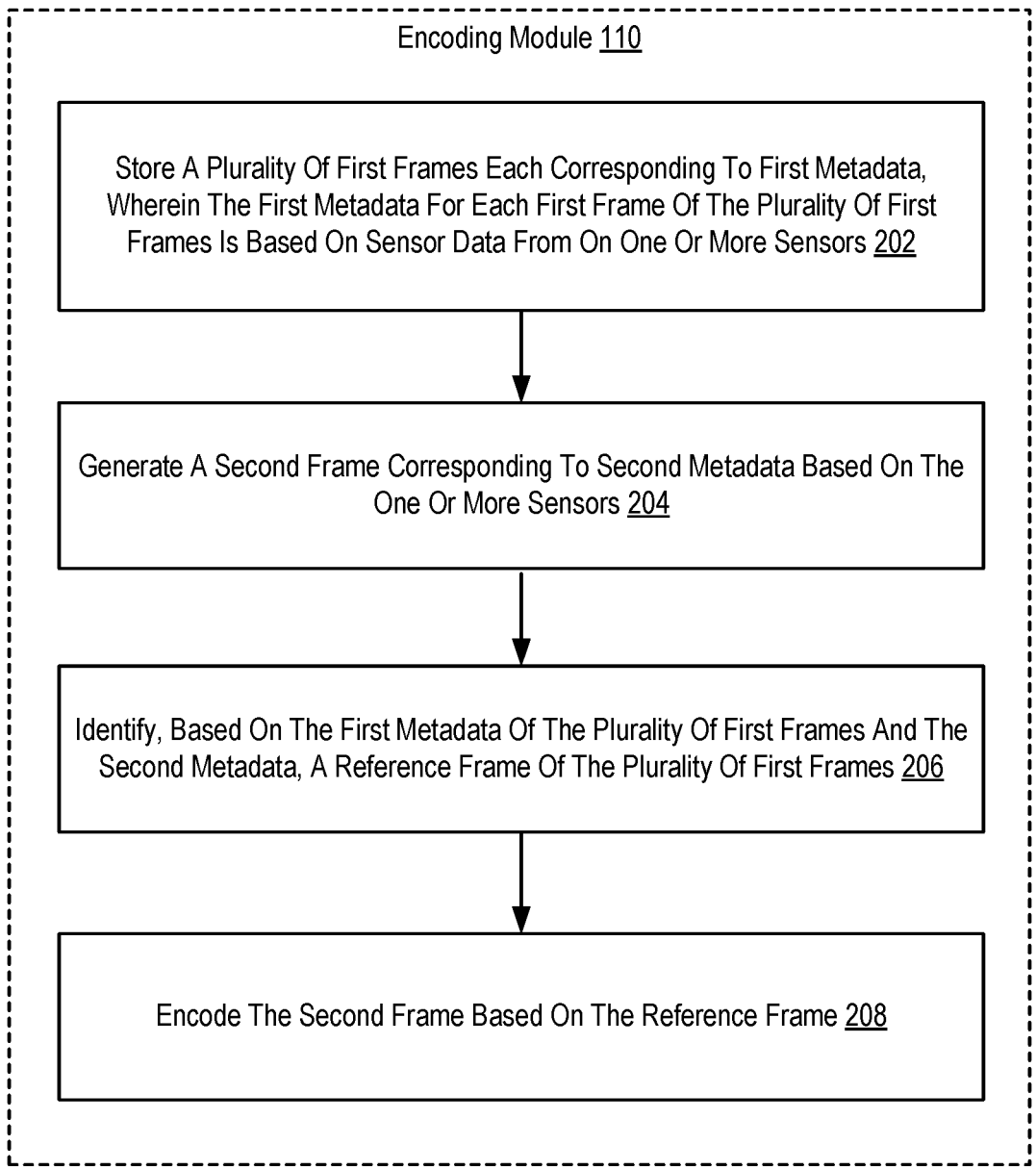
FIG. 2 is a flowchart of an example method for reference frame detection using sensor metadata according to some embodiments.

For further explanation, FIG. 2 sets forth a flow chart illustrating an exemplary method for reference frame detection using sensor metadata that includes storing 202 (e.g., by an encoding module 110, in memory 106) a plurality of first frames each corresponding to first metadata, wherein the first metadata for each frame of the plurality of frames is based on first sensor data from one or more sensors 108. The one or more sensors 108 are hardware sensors 108 that measure orientation or movement of the device 100. For example, in some embodiments, the one or more sensors include an accelerometer, a magnetometer, or a gyroscope. In other embodiments, the one or more sensors 108 includes an Inertial Measurement Unit (IMU) that combines the functionality of an accelerometer, a magnetometer, and a gyroscope. For example, in some embodiments, the one or more sensors 108 includes a 9-axis Inertial Measurement Unit capable of 3-axis magnetic field readings, 3-axis linear acceleration readings, and 3-axis angular rate readings.

The first metadata indicates a motion or orientation of a device 100 used to capture the corresponding frame at the time the corresponding frame was captured. For example, in some embodiments the orientation data includes an angle of orientation (e.g., a pitch, a roll, a yaw) or a heading (e.g., a direction the device 100 was facing). In some embodiment the motion data includes a linear acceleration, a measured gravity, and the like. The first metadata is generated based on the first sensor data from the one or more sensors 108. For example, in some embodiments, a sensor fusion algorithm is applied to the first sensor data from the one or more sensors to generate metrics indicated in the first metadata.

The method of FIG. 2 also includes generating 204 a second frame corresponding to second metadata based on the one or more sensors 108. Generating 204 the second frame includes encoding data from a camera 102 as a digital image. The second metadata includes values similar to the first metadata (e.g., orientation data, movement data, etc.) and indicates the orientation and movement of the device 100 at the time the second frame is captured.

The method of FIG. 2 also includes identifying 206, based on the first metadata of the plurality of first frames and the second metadata, a reference frame of the plurality of first frames. The reference frame is a frame that can be used as a basis for compressing the second frame. In other words, the reference frame is selected such that one or more transformations, when applied to the reference frame, result in the second frame.

In some embodiments, identifying the reference frame includes identifying a first frame of the plurality of first frames having first metadata most similar to the second metadata. For example, the first metadata for each first frame in the plurality of first frames is compared to the second metadata to identify the first frame whose metadata has a highest degree of similarity relative to the second frame. As another example, a subset of the first frames is identified (e.g., N first frames with first metadata having a highest degree of similarity to the second metadata, those first frames with first metadata having a degree of similarity to the second metadata above a threshold). The reference frame is then identified from the subset of the first frames based on image similarity to the second frame. In other words, the reference frame is identified as the first frame in the subset whose image data is most similar to the second frame.

In other embodiments, the reference frame is identified as having absolute values of first metadata most similar to the second metadata but in an opposing direction. For example, assume that a first frame was captured as the device 100 pans across a particular area, and that a second frame was captured as the device 100 pans back across the particular area. In this example, metadata attributes such as linear acceleration would be similar in magnitude, assuming the device 100 pans at a similar speed, but in an opposite direction. One skilled in the art would appreciate that, when evaluating the similarity between first and second metadata for selection of metadata, comparing some attributes is performed to identify similar values of the attributes (e.g., magnetic field readings, headings), while comparing other attributes is performed to find values of similar magnitude but opposite direction (e.g. linear acceleration, gravity).

The method of FIG. 2 also includes encoding 208 the second frame based on the reference frame. Encoding 208 the second frame includes encoding the second frame as one or more transformations, deltas, etc. that, when applied to the reference frame, results in the second frame. As the second encoded frame is encoded with reference to another frame (the reference frame), the encoded second frame requires less data to encode when compared to encoding color data for each pixel of the second frame.

Figure 3:
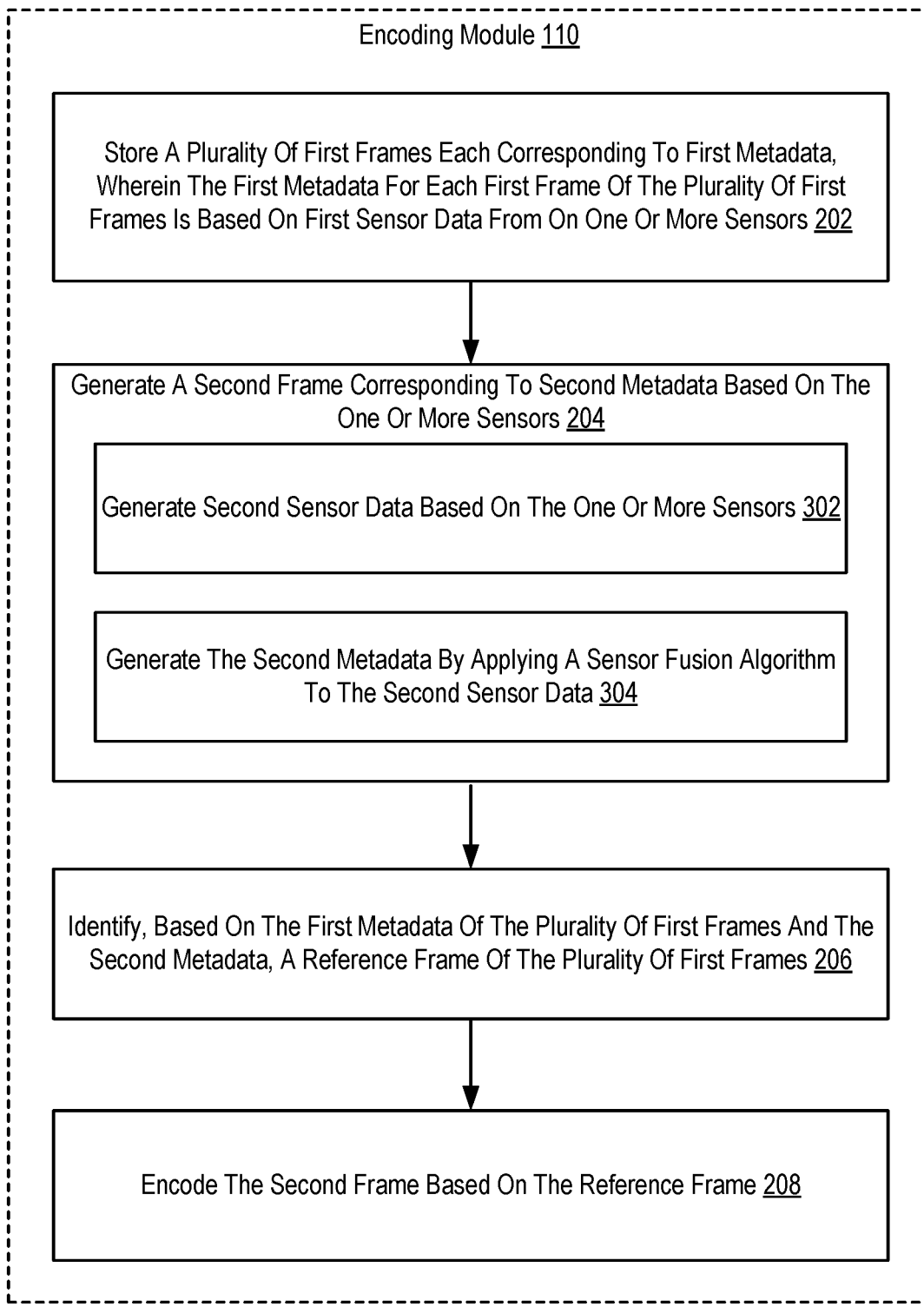
FIG. 3 is a flowchart of an example method for reference frame detection using sensor metadata according to some embodiments.

For further explanation, FIG. 3 sets forth a flow chart illustrating an exemplary method for reference frame detection using sensor metadata that includes storing 202 (e.g., by an encoding module 110, in memory 106) a plurality of first frames each corresponding to first metadata, wherein the first metadata for each frame of the plurality of frames is based on first sensor data from one or more sensors 108; generating 204 a second frame corresponding to second metadata based on the one or more sensors 108; identifying 206, based on the first metadata of the plurality of first frames and the second metadata, a reference frame of the plurality of first frames; and encoding 208 the second frame based on the reference frame.

The method of FIG. 3 differs from FIG. 2 in that generating 204 a second frame corresponding to second metadata based on the one or more sensors 108 includes generating second sensor data 302 based the on one or more sensors 108. The second sensor data is a digital encoding of measurements by the one or more sensors 108 (e.g., via an analog-to-digital conversion, via direct digital encoding by the sensors 108). Examples of sensor data include magnetic field data, linear acceleration data or angular rate data.

The method of further FIG. 3 differs from FIG. 2 in that generating 204 a second frame corresponding to second metadata based on the one or more sensors 108 includes generating 304 the second metadata by applying a sensor fusion algorithm to the second sensor data. A sensor fusion algorithm is an algorithm that accepts, as input, sensor readings from a plurality of sensors and calculates, from these sensor readings, various metrics. Example metrics include an angle of orientation of the device 100 (e.g., pitch, a roll, a yaw), a heading (e.g., a faced direction) of the device 100, a linear acceleration of the device 100, or a measured gravity experienced by the device. For example, the sensor fusion algorithm accepts, as input, magnetic field data, linear acceleration data, and angular rate data and provides, as output, an angle of orientation, a heading, a linear acceleration, and a measured gravity for the device.

Figure 4:
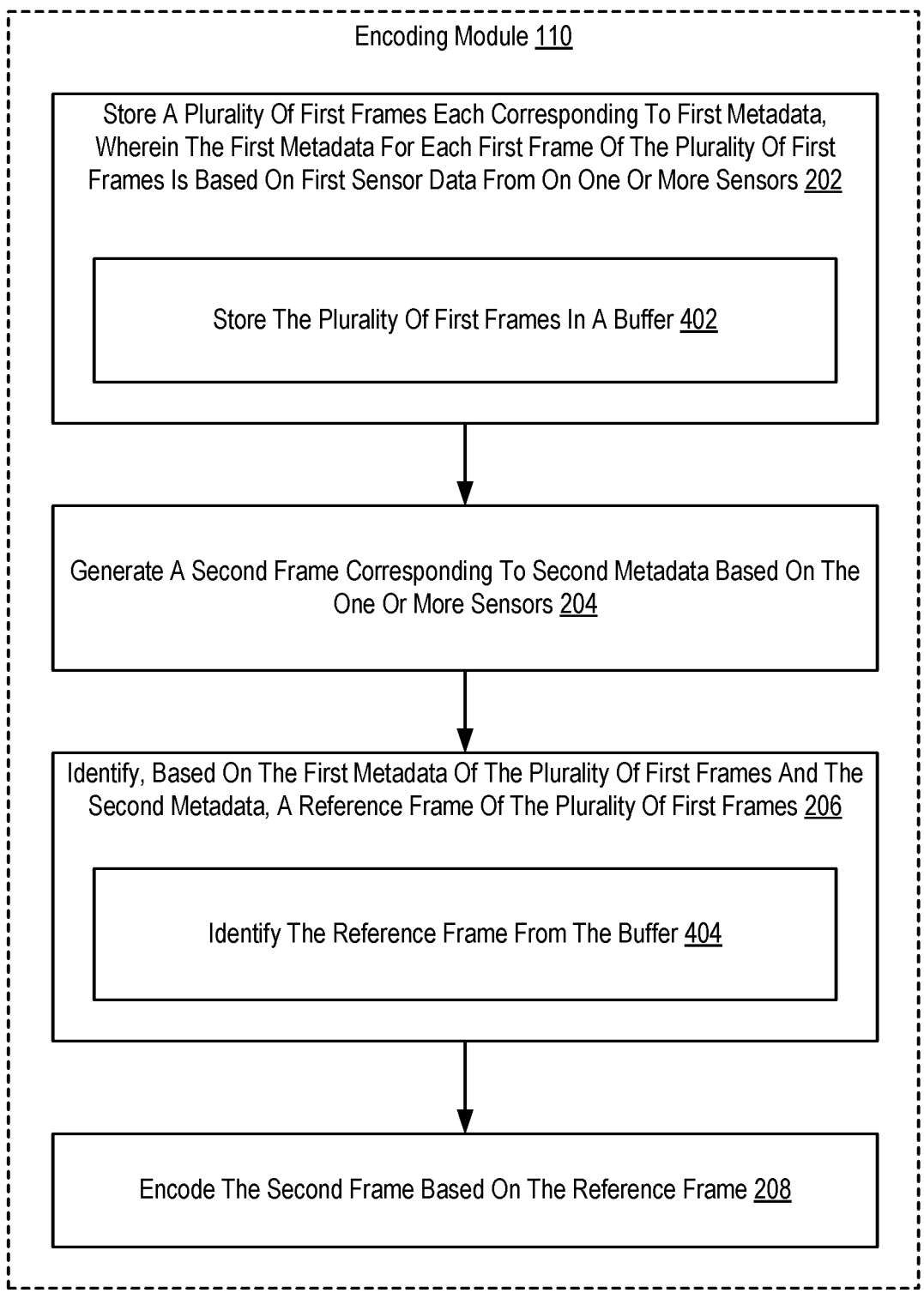
FIG. 4 is a flowchart of an example method for reference frame detection using sensor metadata according to some embodiments.

For further explanation, FIG. 4 sets forth a flow chart illustrating an exemplary method for reference frame detection using sensor metadata that includes storing 202 (e.g., by an encoding module 110, in memory 106) a plurality of first frames each corresponding to first metadata, wherein the first metadata for each frame of the plurality of frames is based on first sensor data from one or more sensors 108; generating 204 a second frame corresponding to second metadata based on the one or more sensors 108; identifying 206, based on the first metadata of the plurality of first frames and the second metadata, a reference frame of the plurality of first frames; and encoding 208 the second frame based on the reference frame.

The method of FIG. 4 differs from FIG. 2 in that storing 202 the plurality of first frames includes storing 402 the plurality of first frames in a buffer 112. The buffer 112 is an allocated portion of memory 106 for storing frames prior or concurrent to storing the frames in longer-term storage (e.g., non-volatile memory 106). For example, the buffer 112 stores the N-most recently encoded frames. The encoding module 110 stores a new frame in the buffer 112 by overwriting the oldest stored frame, assuming a fully occupied buffer 112. The method of FIG. 4 differs from FIG. 2 in that identifying 206 the reference frame of the plurality of first frames include identifying 404 the reference frame from the buffer 112. Thus, in some embodiments, the reference frame is identified from N most recently encoded frames that are stored in the buffer 112.

Figure 5:
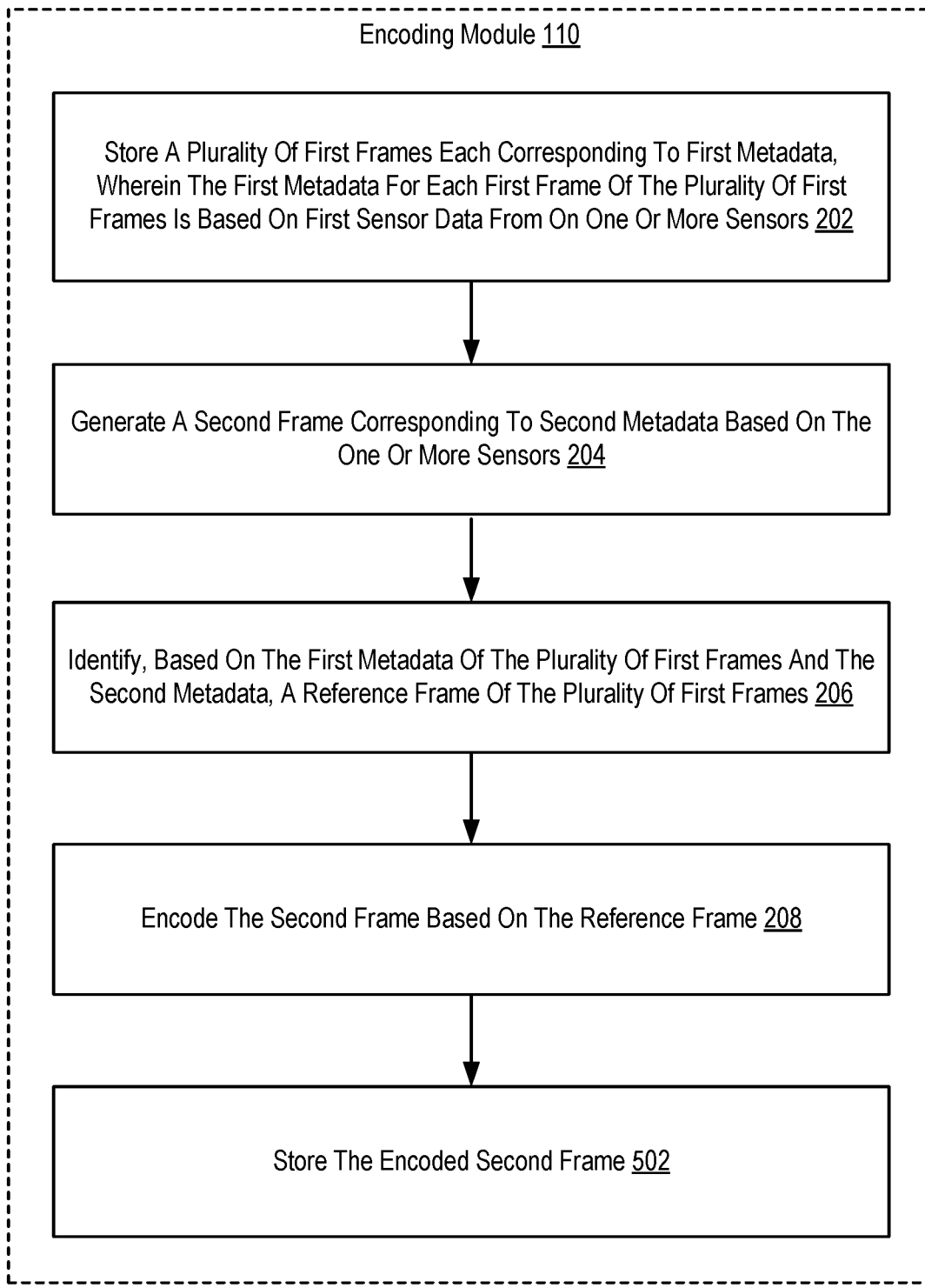
FIG. 5 is a flowchart of an example method for reference frame detection using sensor metadata according to some embodiments.

For further explanation, FIG. 5 sets forth a flow chart illustrating an exemplary method for reference frame detection using sensor metadata that includes storing 202 (e.g., by an encoding module 110, in memory 106) a plurality of first frames each corresponding to first metadata, wherein the first metadata for each frame of the plurality of frames is based on first sensor data from one or more sensors 108; generating 204 a second frame corresponding to second metadata based on the one or more sensors 108; identifying 206, based on the first metadata of the plurality of first frames and the second metadata, a reference frame of the plurality of first frames; and encoding 208 the second frame based on the reference frame.

The method of FIG. 5 differs from FIG. 2 in that the method of FIG. 5 includes storing 502 the encoded second frame. In some embodiments, the encoded second frame is stored in non-volatile memory 106. In some embodiments, the encoded second frame is stored in the buffer 112. Thus, the second frame serves as a candidate reference frame for subsequently generated frames until the second frame is overwritten in the buffer 112 or removed from the buffer 112.

In view of the explanations set forth above, readers will recognize that the benefits of reference frame detection using sensor metadata include:

Improved performance of a computing system by a computationally efficient approach for identifying reference frames, improving the computational burden of frame compression and increasing the availability of reference frames for compression.

Exemplary embodiments of the present disclosure are described largely in the context of a fully functional computer system for reference frame detection using sensor metadata. Readers of skill in the art will recognize, however, that the present disclosure also can be embodied in a computer program product disposed upon computer readable storage media for use with any suitable data processing system. Such computer readable storage media can be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

The present disclosure can be a system, a method, or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can include copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations or block diagrams of methods, apparatus (systems), and computer program products according to embodiments of the disclosure. It will be understood that each block of the flowchart illustrations or block diagrams, and combinations of blocks in the flowchart illustrations or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein includes an article of manufacture including instructions which implement aspects of the function/act specified in the flowchart or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

It will be understood from the foregoing description that modifications and changes can be made in various embodiments of the present disclosure. The descriptions in this specification are for purposes of illustration only and are not to be construed in a limiting sense. The scope of the present disclosure is limited only by the language of the following claims.

What is claimed is:

1. A method of reference frame detection using sensor metadata, the method comprising:
   storing a plurality of first frames each corresponding to first metadata, wherein the first metadata for each first frame of the plurality of first frames is based on first sensor data from a plurality of sensors;
   generating a second frame having second metadata that is based on second sensor data from the plurality of sensors;
   identifying, based on the first metadata and the second metadata, a reference frame of the plurality of first frames, wherein the reference frame is identified based on a similarity of an absolute value of metadata of the reference frame to an absolute value of the second metadata exceeding a threshold similarity, and wherein the metadata of the reference frame indicates an opposing direction to the second metadata; and
   based on the identification, encoding the second frame based on the reference frame.

2. The method of claim 1, wherein the plurality of sensors comprise an accelerometer, a magnetometer, or a gyroscope.

3. The method of claim 1, wherein at least one of the plurality of sensors comprise an Inertial Measurement Unit (IMU).

4. The method of claim 1, wherein generating the second frame comprises:
   generating the second sensor data based on the plurality of sensors; and
   generating the second metadata by applying a sensor fusion algorithm to the second sensor data.

5. The method of claim 4, wherein the second sensor data comprises magnetic field data, linear acceleration data, or angular rate data.

6. The method of claim 4, wherein the second metadata comprises an angle of orientation, a heading, a linear acceleration, or a measured gravity.

7. The method of claim 1:
   wherein storing the plurality of first frames comprises storing the plurality of first frames in a buffer; and
   wherein identifying the reference frame comprises identifying the reference frame from the buffer.

8. An apparatus for reference frame detection using sensor metadata, the apparatus comprising a computer processor, a computer memory operatively coupled to the computer processor, the computer memory having disposed therein computer program instructions that, when executed by the computer processor, cause the apparatus to:
   store a plurality of first frames each corresponding to first metadata, wherein the first metadata for each first frame of the plurality of first frames is based on first sensor data from a plurality of sensors;
   generate a second frame having second metadata that is based on second sensor data from the plurality of sensors;
   identify, based on the first metadata and the second metadata, a reference frame of the plurality of first frames, wherein the reference frame is identified based on a similarity of an absolute value of metadata of the reference frame to an absolute value of the second metadata exceeding a threshold similarity, and wherein the metadata of the reference frame indicates an opposing direction to the second metadata; and based on the identification, encode the second frame based on the reference frame.

9. The apparatus of claim 8, wherein at least one of the plurality of sensors comprise an accelerometer, a magnetometer, or a gyroscope.

10. The apparatus of claim 8, wherein the plurality of sensors comprise an Inertial Measurement Unit (IMU).

11. The apparatus of claim 8, wherein generating the second frame comprises:

generating the second sensor data based on the plurality of sensors; and generating the second metadata by applying a sensor fusion algorithm to the second sensor data.

12. The apparatus of claim 11, wherein the second sensor data comprises magnetic field data, linear acceleration data, or angular rate data.

13. The apparatus of claim 11, wherein the second metadata comprises an angle of orientation, a heading, a linear acceleration, or a measured gravity.

14. The apparatus of claim 8:

wherein storing the plurality of first frames comprises storing the plurality of first frames in a buffer; and wherein identifying the reference frame comprises identifying the reference frame from the buffer.

15. A computer program product disposed upon a non-transitory computer readable medium, the computer program product comprising computer program instructions for reference frame detection using sensor metadata that, when executed, cause a computer system to:

store a plurality of first frames each corresponding to first metadata, wherein the first metadata for each first frame of the plurality of first frames is based on first sensor data from a plurality of sensors;

generate a second frame having second metadata that is based on second sensor data from the plurality of sensors;

identify, based on the first metadata and the second metadata, a reference frame of the plurality of first frames, wherein the reference frame is identified based on a similarity of an absolute value of metadata of the reference frame to an absolute value of the second metadata exceeding a threshold similarity, and wherein the metadata of the reference frame indicates an opposing direction to the second metadata; and based on the identification, encode the second frame based on the reference frame.

16. The computer program product of claim 15, wherein the plurality of sensors comprise an accelerometer, a magnetometer, or a gyroscope.

17. The computer program product of claim 15, wherein at least one of the plurality of sensors comprise an Inertial Measurement Unit (IMU).

18. The computer program product of claim 15, wherein generating the second frame comprises:

generating the second sensor data based on the plurality of sensors; and generating the second metadata by applying a sensor fusion algorithm to the second sensor data.

19. The computer program product of claim 18, wherein the second sensor data comprises magnetic field data, linear acceleration data, or angular rate data.

20. The computer program product of claim 18, wherein the second metadata comprises an angle of orientation, a heading, a linear acceleration, or a measured gravity.

21. The computer program product of claim 15:

wherein storing the plurality of first frames comprises storing the plurality of first frames in a buffer; and wherein identifying the reference frame comprises identifying the reference frame from the buffer.

\* \* \* \* \*